(12) United States Patent
Bailey (10) Patent No.: US 9,239,916 B1
(45) Date of Patent: Jan. 19, 2016

(54) USING SPATIAL DIVERSITY WITH SECRETS

(75) Inventor: Daniel V. Bailey, Pepperell, MA (US)

(73) Assignee: EMC Corporation, Hopkinton, MA (US)

( * ) Notice: Subject to any disclaimer, the term of this patent is extended or adjusted under 35 U.S.C. 154(b) by 975 days.

(21) Appl. No.: 13/247,167

(22) Filed: Sep. 28, 2011

(51) Int. Cl.
  *G06F 7/04* (2006.01)
  *G06F 21/36* (2013.01)

(52) U.S. Cl.
  CPC ........ *G06F 21/36* (2013.01); *G06F 2221/2133* (2013.01)

(58) Field of Classification Search
  CPC ........................ G06F 21/36; G06F 2221/2133
  USPC ........................................................ 726/21
  See application file for complete search history.

(56) References Cited

U.S. PATENT DOCUMENTS

| | | | |
|---|---|---|---|
| 6,721,738 B2 * | 4/2004 | Verplaetse et al. ............ 700/237 |
| 2007/0040780 A1 * | 2/2007 | Gass et al. ....................... 345/87 |
| 2009/0320123 A1 * | 12/2009 | Yu et al. .......................... 726/16 |
| 2010/0328074 A1 * | 12/2010 | Johnson et al. ............. 340/573.1 |
| 2011/0202466 A1 * | 8/2011 | Carter .............................. 705/67 |
| 2011/0234605 A1 * | 9/2011 | Smith et al. .................... 345/522 |
| 2012/0291122 A1 * | 11/2012 | Chow et al. ...................... 726/19 |

OTHER PUBLICATIONS

Surman et al., Head Tracked Single and Multi-user Autostereoscopic Displays, 2006, Retrieved from the Internet <URL: citeseerx.ist.psu.edu/viewdoc/download?doi=10.1.1.102.6918&rep=rep1&type=pdf>, pp. 1-9.*
Rolko et al., 3d Captcha, 2010, Retrieved from the Internet <URL: 3dcaptcha.net/documents/3D_captcha.pdf>, pp. 1-15 as printed.*
Susilo et al., STE3D-CAP: Stereoscopic 3D Captcha, 2010, Retrieved from the Internet <URL: springerlink.com/content/183j4v0153q57281/fulltext.pdf>, pp. 1-20 as printed.*
Steinicke et al.; Multi-Touching 3D Data: Towards Direct Interaction in Stereoscopic Display Environments coupled with Mobile Devices; 2008; Retrieved from the Internet <URL: http://citeseerx.ist.psu.edu/viewdoc/download?doi=10.1.1.187.1133&rep=rep1&type=pdf>; pp. 1-6 as printed.*

* cited by examiner

*Primary Examiner* — Michael Chao
(74) *Attorney, Agent, or Firm* — Krishnendu Gupta; Jason A. Reyes (57) ABSTRACT

A method is used in using spatial diversity with secrets. A spatially diverse presentation is presented. A reaction of a user to the spatially diverse presentation is received and analyzed. The analysis is used as a basis for helping to determine whether the user has knowledge of a secret.

16 Claims, 6 Drawing Sheets

USING SPATIAL DIVERSITY WITH SECRETS

BACKGROUND

1. Field of the Invention

The present invention relates to using spatial diversity with secrets.

2. Description of Related Art

Spatial audio is sound processed to give the listener the impression of a sound source within a multi-dimensional environment. Spatial audio presents a more realistic experience when listening to recorded sound compared to conventional stereo because stereo only varies across one axis, usually the x (horizontal) axis. Spatial audio may vary across two or more axes (e.g., x, y and/or z).

The principle of spatial audio is simple: if the sound waves arriving at a listener's eardrums are identical to those of a real audio source at a particular position, the listener will perceive that sound as coming from a source at that particular position. Because people only have two ears, only two channels of sound are needed to create this effect, and the spatial sound can be presented, for example, over ordinary two-channel headphones.

Stereopsis is the process by which the visual perception of depth is obtained by viewing two slightly different projections of an image. Stereoscopic systems provide the sensation of a three-dimensional ("3D" or "3-D") image by presenting a first two-dimensional image to the right eye of the viewer and a second, slightly different two-dimensional image to the left eye of the viewer. The first and second images can be taken from two points of view that are approximately the spacing between the viewer's right and left eyes. The viewer's visual perception then perceives the horizontal disparity between the first image presented to the right eye and the second image presented to the left eye as a 3D image. (In at least some cases, to achieve the full 3D effect, specialized stereoscopic eyeglasses that can control delivery of the images to each eye must be worn.) Thus, the isolated images observed by each eye are able to "trick" the brain, which perceives the dual images as a single image with 3D qualities.

Figure 4:
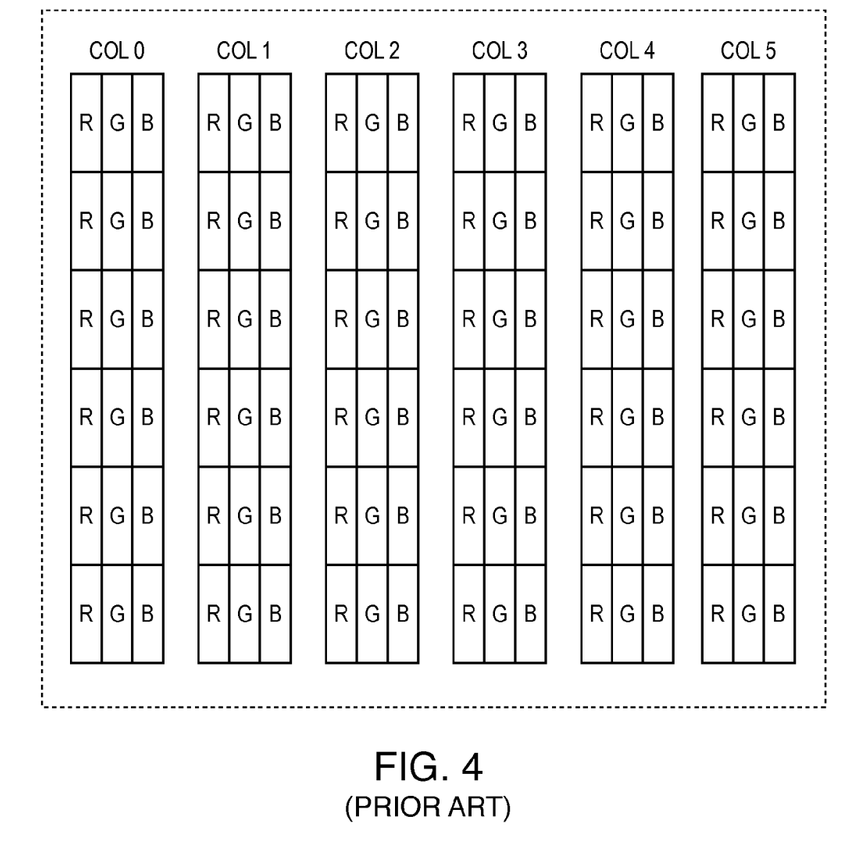
FIGS. 4-6 are illustrations of one or more prior art techniques.
Figure 5:
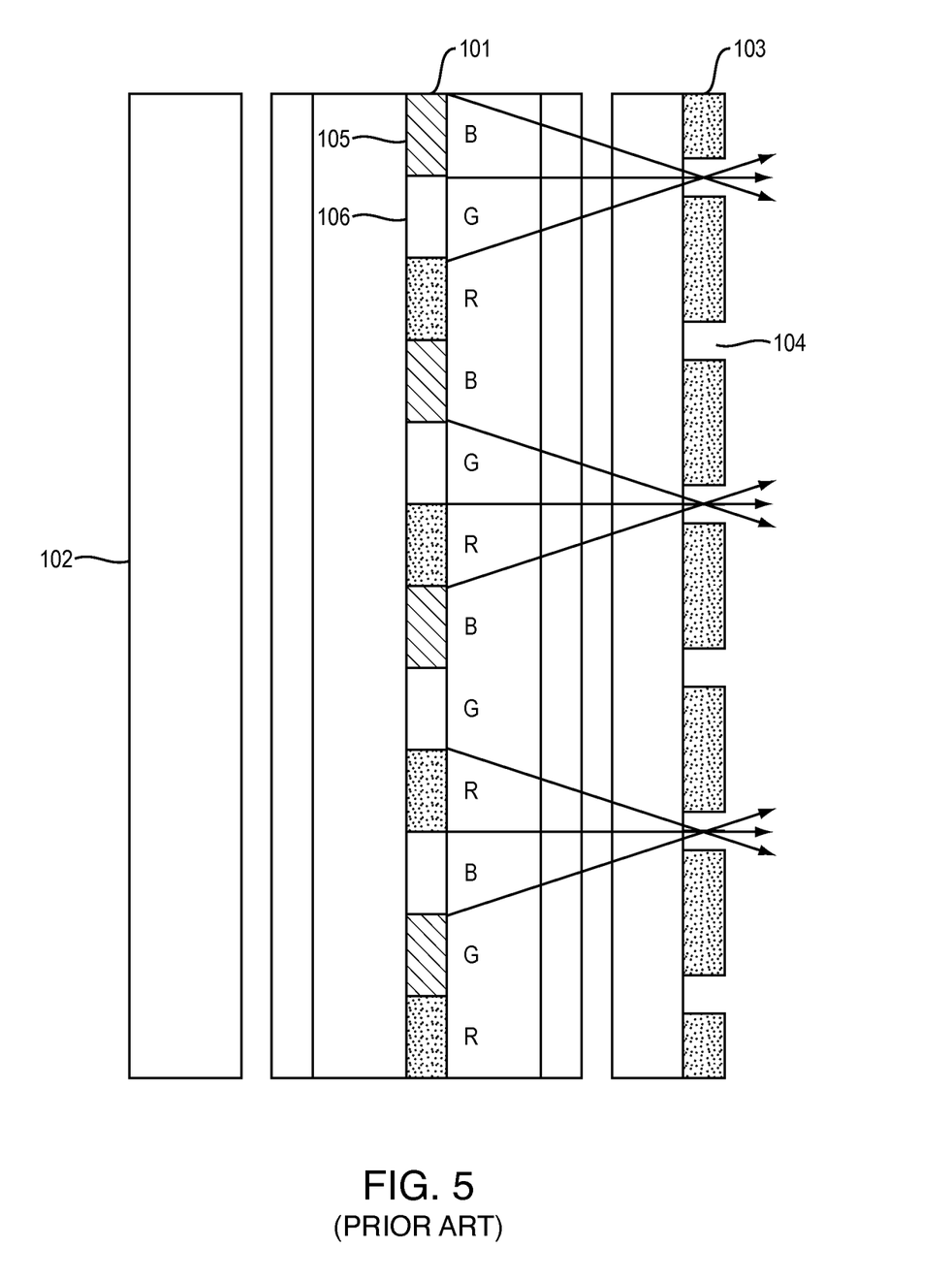
Figure 6:
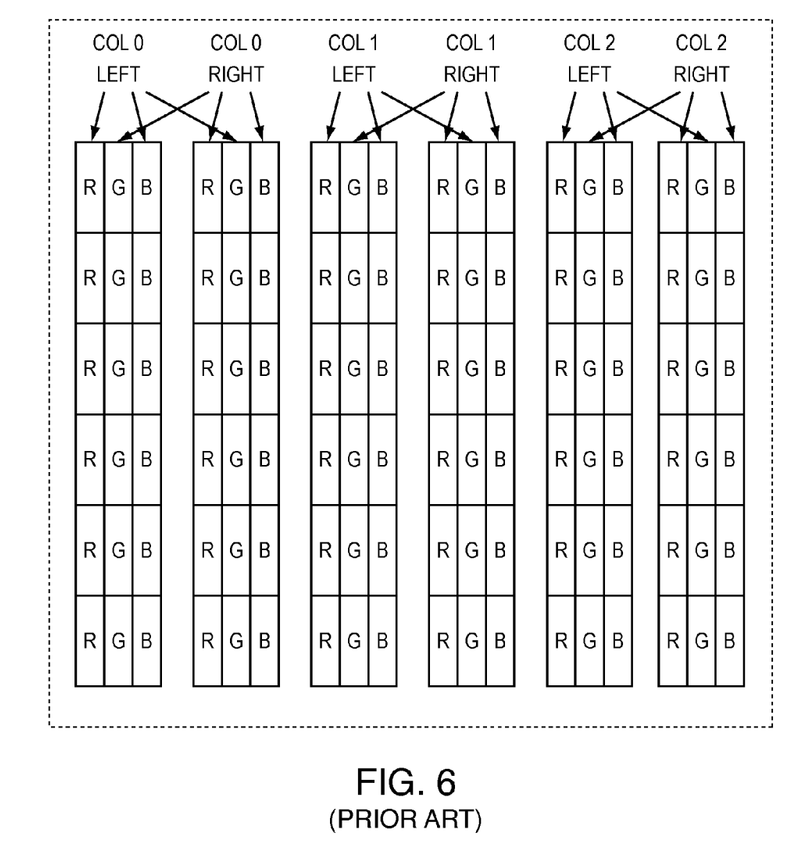

FIGS. 4-6 illustrate an example configuration of a 3D display. FIG. 4 shows a layout of pixels of a liquid crystal device (a liquid crystal display (LCD)) of a standard type. An LCD is used in a color display and configured of pixels of red, green and blue represented by R, G and B, respectively. With reference to the figure, the pixels are arranged in columns Col0 to Col5 formed of red, green and blue pixels arranged vertically. Of the pixels, the leftmost column Col0 displays the leftmost strip of an image displayed by the liquid crystal device and the right-hand column Col1 displays the next column of the image, . . . , and so on.

FIG. 5 shows a display used to provide a 3D stereoscopic representation. With reference to the figure, the 3D display includes a liquid crystal display device 101 (including a polarization plate) acting as a spatial optical modulator adjusting light from a backlight 102 in accordance with content of an image to be displayed. A parallactic optical system cooperates with liquid crystal display device 101 to form a viewing window. FIG. 5 shows a configuration of a 3D, automatic, stereoscopic display of a front parallax barrier type having a parallax barrier 103 as a parallactic optical system. Parallax barrier 103 includes a plurality of slits extending vertically and laterally equally spaced and also arranged in parallel. Each slit is located at a center of a pair of columns of pixels of a color and that of pixels of a different color. For example in FIG. 5 a slit 104 is located at a center of a blue pixel column 105 and a green pixel column 106.

To ensure that right and left viewing windows are properly arranged, right and left image data are supplied by the method shown in FIG. 6 to liquid crystal display device 101 of the FIG. 5 type. In FIG. 6, color image data of a leftmost strip of a left image is displayed by a red, green and blue pixel column Col0 LEFT. Likewise, color data of a leftmost strip of a view for the right eye is displayed by a pixel column Col0 RIGHT. The FIG. 6 arrangement ensures that right and left views' image data are sent to appropriate right and left viewing windows. This arrangement also ensures that three pixel colors R, G, B are all used to display each view strip.

Thus in the FIG. 6 layout, as compared with the FIG. 4 layout, the leftmost column's red and blue pixels display a left view's image data while the same column's green pixel displays a right view's image data. In the right-hand column, red and blue pixels display the right view's image data while a green pixel displays the left view's image data. Thus if a liquid crystal display device of a standard type shown in FIGS. 4-6 is used, it is necessary to "exchange" a green component between RGB pixel columns to interlace right and left views' image data. It is a matter of course that for some display settings, red or green component may be exchanged.

The use of portable electronic devices and telecommunication devices has increased rapidly in recent years, and many such devices are equipped with 3D displays, and also motion sensors. In an object instrumented by a motion or position sensor (also referred to as detector), the sensor may be used to convert movements of a user carrying the object into movements of a point in a plane. Such an object can thus be designated generically by the term "pointer". The user normally holds the pointer in his hand, although other modes of carriage may easily be envisaged depending on the applications. The movements of the pointer in space comprise rotations and translations. They can be measured by sensors of various types: image sensors can measure rotations and translations at one and the same time by comparison of successive images and geometric transformations; a magnetometer, an accelerometer or a single-axis gyrometer can measure a rotation about said axis; a combination of magnetometers, accelerometers and/or of gyrometers can measure the translations and rotations about several axes; a combination of sensors of the previous types improve measurement accuracy, redundancy allowing determination of confidence intervals; the combination can comprise one or more cameras and several magnetometric, accelerometric and/or gyrometric sensors. Another rotation sensor, insensitive to accelerations, may be a brightness sensor. If it is a photoelectric cell, it is known that the amount of light received by said cell is proportional to its light receiving area and to the cosine of the angle of inclination of the rays with its normal. The light source may be the sun, or some other quasi-pointlike source, bulb type, situated far enough away for its emission rays to be considered parallel to one another over the whole of the volume of the gestural experience.

More and more smartphones (such as Apple's iPhone) are incorporating motion and position sensors such as accelerometers for step counters, user interface control, and switching between portrait and landscape modes.

A large number of services such as email, shopping, banking, unified communications, legal, or investing services require subscribers of the services to enter a user name (also called user ID) and/or a password to access said services. This process is called authentication. Typically, entry of the user name and/or password is performed using a user interface of a client device, such as a smartphone with web capabilities.

SUMMARY OF THE INVENTION

A method is used in using spatial diversity with secrets. A spatially diverse presentation is presented. A reaction of a user to the spatially diverse presentation is received and analyzed. The analysis is used as a basis for helping to determine whether the user has knowledge of a secret.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in using spatial diversity with secrets. In at least one embodiment, the technique may be used to allow a user to prove knowledge of a piece of information, e.g., a visual scene, a sound, or specific orientation or gesture of a device, and this piece of information can be used as a component of a secret password. In at least one embodiment, viewing angle restrictions in accordance with the technique can be used to help defeat at least some forms of shoulder surfing attacks.

Figure 1:
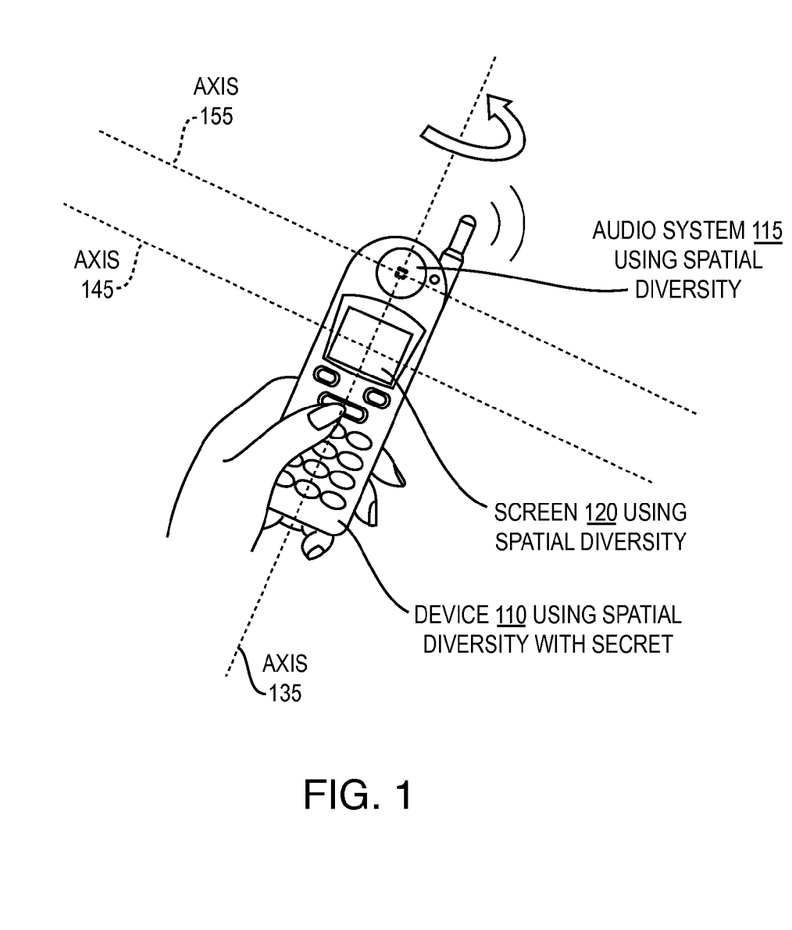
FIGS. 1-2 illustrate an example device that may be used with an embodiment of the technique described herein.

Referring to FIG. 1, illustrated is a device that may be used in accordance with an embodiment of the current technique. As shown, device 110 can be a mobile or handheld electronic device. Device 110 can take any of various forms in various embodiments of the current technique, provided that the device 110 performs the functions required of the device 110 for using spatial diversity with secrets. The device 110 can be implemented in a package having any of a wide variety of shapes and form factors. For example, in some embodiments the device 110 can be, or be incorporated within, a telecommunications device such as a cellular telephone, or a cellular telephone with specialized embedded hardware adapted to interact with the cellular telephone's circuitry, such as a SIM card. At least one embodiment of the device 110 includes a microprocessor with on-board memory and a power source, and, as described below, a display or screen 120 and an audio system 115. Embodiments may optionally include a keypad or buttons for key entry, PIN entry, entry of authentication information requests, or for other entry or interaction with the device 120. Other sizes, shapes, and implementations are possible without departing from the spirit of the invention.

Device 110 may be tilted, rotated, swiveled, turned, or otherwise moved relative to one or more of axes 135, 145, 155, as described further below. In at least one embodiment, screen 120 defines axes 135, 145, wherein axis 135 is parallel to the screen's horizontal direction and axis 145 is parallel to the screen's vertical direction. In one or more embodiments, at least one of axes 135, 145 passes through a midpoint of screen 120. In at least one embodiment, audio system 115 defines axes 135, 155, wherein system 115 has a speaker system and axis 135 is parallel to the horizontal direction of the face of the speaker system and axis 145 is parallel to the vertical direction of the face of the speaker system. In one or more embodiments, at least one of axes 135, 145 passes through a midpoint of the speaker system.

With respect to passwords or secrets from visual and audible spatial diversity, small form factor 3-dimensional displays such as screen 120 allow the user to perceive a three-dimensional image being displayed without having to use goggles. Such a display relies on optics in the display itself in order to achieve the desired effect. Optics in the display allow the user to perceive a different image based on viewing angle. Based on calibrating the phone's display and the user holding it at the correct distance and orientation, the user's left and right eyes can be shown different images.

The underlying LCD display is divided up into a number of discrete sectors. In a simple application enabling different images to be shown to two different viewing angles, the display is divided into two sectors. Optics integrated into the front of the display act as a lens focusing the light emitted by each sector to a particular viewing angle; in this case to each of the user's eyes. Software carefully constructs two images so that the user's visual processing converges the two images to make one stereoscopic 3-D picture.

For user convenience for example, some displays use more than two sectors. So that multiple viewing positions are possible, more sectors are made available. The user still must take care to align the display in the correct orientation, but because one of several orientations may be selected by the user at any time, the device can support stereoscopic display both, for example, while being held in the user's hand, and also while sitting in a car cradle. This approach can also allow 3-D displays simultaneously to two different users.

With respect to this technology and security, by combining user perceptible differences made possible by the viewing angle distinction, with the accelerometers present on the phone, the phone can detect which viewing angle is currently being displayed to the user. This means that the viewing angle and phone orientation can be combined to be a component of a password. In at least one example described in more detail below, the user and phone engage in a challenge-response protocol: the user is required to identify a correct image out of a collection of images displayed to different viewing angles.

In general, this technology can be used to provide ways that the user can prove knowledge of a simple piece of information: either a visual scene, a sound, or specific orientation. These simple pieces of information can be a component of a secret password. Moreover, the viewing angle restrictions can defeat some forms of shoulder surfing attacks.

Using the same physical underlying display, viewing angle differences lead to different images. Accordingly, part of a user-selected image can be displayed, and the phone uses its motion or position detectors (e.g., accelerometers) to determine its current orientation and verifies that the correct image is being seen by the user. In an alternative embodiment, if the accelerometers are not relied upon, the image may also display a short (e.g., three digit) number that the user may enter into the phone's keypad. Depending on the embodiment, a user may be expected to select a series of images instead of just one image, and repeat this process until a required or desired security level is achieved.

With respect to audible spatial diversity, systems are available that cause a listener to perceive that a particular sound is coming from a localized area, such as from behind the listener, even if no speaker is physically present in that area. Devices using enhanced versions of this technology have been has been improved to the point that in a given room, a particular listener may be able to hear one audio track while another listener in the same room hears something completely different, all from the same speaker system.

In a case in which this technology is incorporated into a mobile phone, the individual sound drivers are small and focused, and may include high precision focused drivers that can target particular sounds based on the user's hearing angle. This can be used as a different or additional factor in collecting a user's password. In this case, the user's password may include a certain orientation of the phone, wherein only in that orientation is the correct password (e.g., one-time password or a simple favorite phrase) spoken. In this case, the phone can use its accelerometers to automatically detect its current orientation.

Where supported by the underlying display or audio technology, an embodiment may use a flowing gesture that the user performs with the phone in order to perceive the image or one-time password in its entirety. For example, the sound playback technology may be configured to focus its audible energy not at one fixed point in space, but at a point being rotated or translated in space. The user may record a particular gesture and the sound playback would reach the user's ears continuously as the user performs the slow gesture. Where supported by the underlying technology, the same approach may be taken with viewing angle wherein a continuous orientation is required to demonstrate knowledge of the password, instead of a fixed selection among a set of possible orientations. The other images presented are mock images associated with incorrect one-time passwords, so that the user tilts the phone until the user sees the correct (favorite) image, and then selects either automatically using the accelerometers, or by inputting a displayed one-time password. For example, with a phone with a display that can simultaneously show 16 different images at 16 different respective viewing angles, the user selects a favorite image at system setup time, and then at runtime, the favorite image is randomly assigned to one of the 16 different viewing angles. In the example, correctly identifying a particular viewing angle proves knowledge of a small piece of information.

A user is ordinarily limited to perceiving at most two viewing angle-specific images at once, and this limitation can be used in special security situations. For example, an application may have a feature in which input from multiple users is required in order to achieve a particular result. In an example, Alice has lost her phone and is therefore unable to login. Her friend Bob has his phone, and he is willing to vouch for Alice as being legitimate. The phone may be placed on a table, or in Bob's hands, and two different images may be shown simultaneously: one password for Bob, and another password for Alice. The images may be shown quickly enough that Alice could not reasonably see her viewing angle as well as Bob's. The two of them may then enter the displayed one-time passwords into the correct consuming application so that Bob can vouch for Alice. This type of approach may be applied any time a system needs two users to authenticate simultaneously.

With respect to improvements over conventional practice, when the phone's internal accelerometers are used to detect orientation, the user does not need to type any digits and can merely hold the phone in the correct orientation, so there is nothing extra to type. Moreover, a visual scene can be easier to remember, especially if it is user-selectable at enrollment time. A user can be expected instantly to recognize the user's pets or family members from a series of photographs, so there is nothing extra to remember.

With respect to ease of use, the user does not need to type anything extra, or remember strings of random digits. In the case of audible spatial diversity, the user need not look at the screen to authenticate, so the user's eyes may remain involved in another task such as driving.

With respect to security, where the technique is implemented within essentially a challenge-response protocol, it may be repeated until sufficient assurance is provided. In the case of a phone that can display 16 images simultaneously to different respective viewing angles and the user enrolls five favorite images, in each round, the phone may display one of the favorite images along with 15 random unenrolled images, from which the user selects the favorite image. In such a case, a random-guessing attacker thus has a 1 in 16 chance of correctly selecting the image. By repeating this process four times, a random-guessing attacker has only a 1 in 4,096 chance of success. To reach a threshold of 1 in 10,000 a phone can either do an additional image-recognition round or have the user input a 1-digit PIN.

In another advantage, the use of spatial diversity helps resist shoulder-surfing by making it more difficult for a nearby attacker to see or hear what the user can see or hear.

Figure 2:
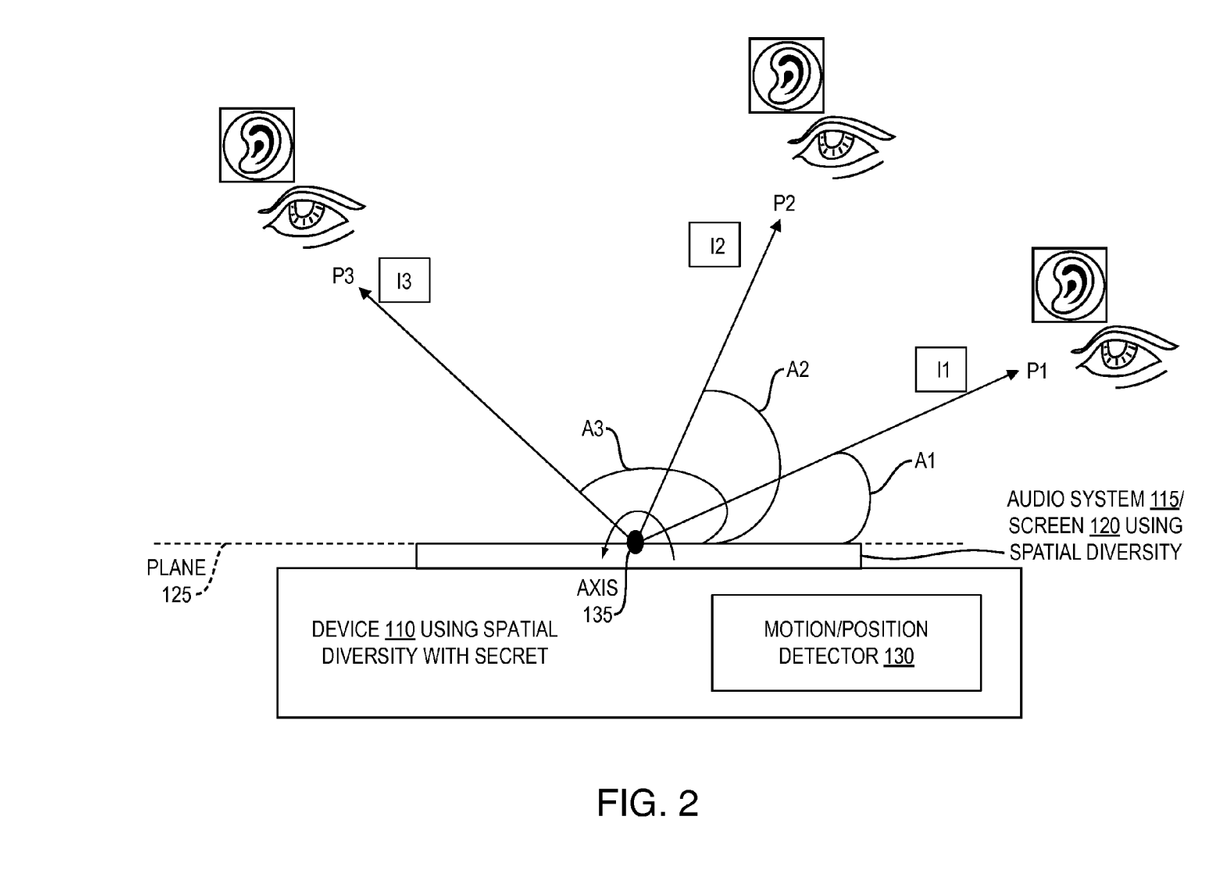

Referring now also to FIG. 2, shown is a diagram of an example implementation using audio system 115 and/or screen 120, where plane 125 is defined by axis 135 together either with axis 155 when the technique uses audio system 115 or with axis 145 when the technique uses screen 120. The user can tilt device 110 relative to one or more of axis 135, 145, 155.

Device 130 has motion/position detector 130 which, for example, may be, include, or be included in one or more magnetometric, accelerometric and/or gyrometric sensors. System 115 or screen 120 can simultaneously present respective images I1, I2, I3 (each of which may be or include one or more sound signals or visual images or videos) at respective angles A1, A2, A3 to respective positions P1, P2, P3. A user starting at a fixed position, e.g., at angle 0 relative to plane 125 so that device 110 is viewed from the side, can perceive such images in sequence by rotating device 110 around axis 135. For example, if the user rotates device 110 by angle A1, the user can perceive I1.

Figure 3:
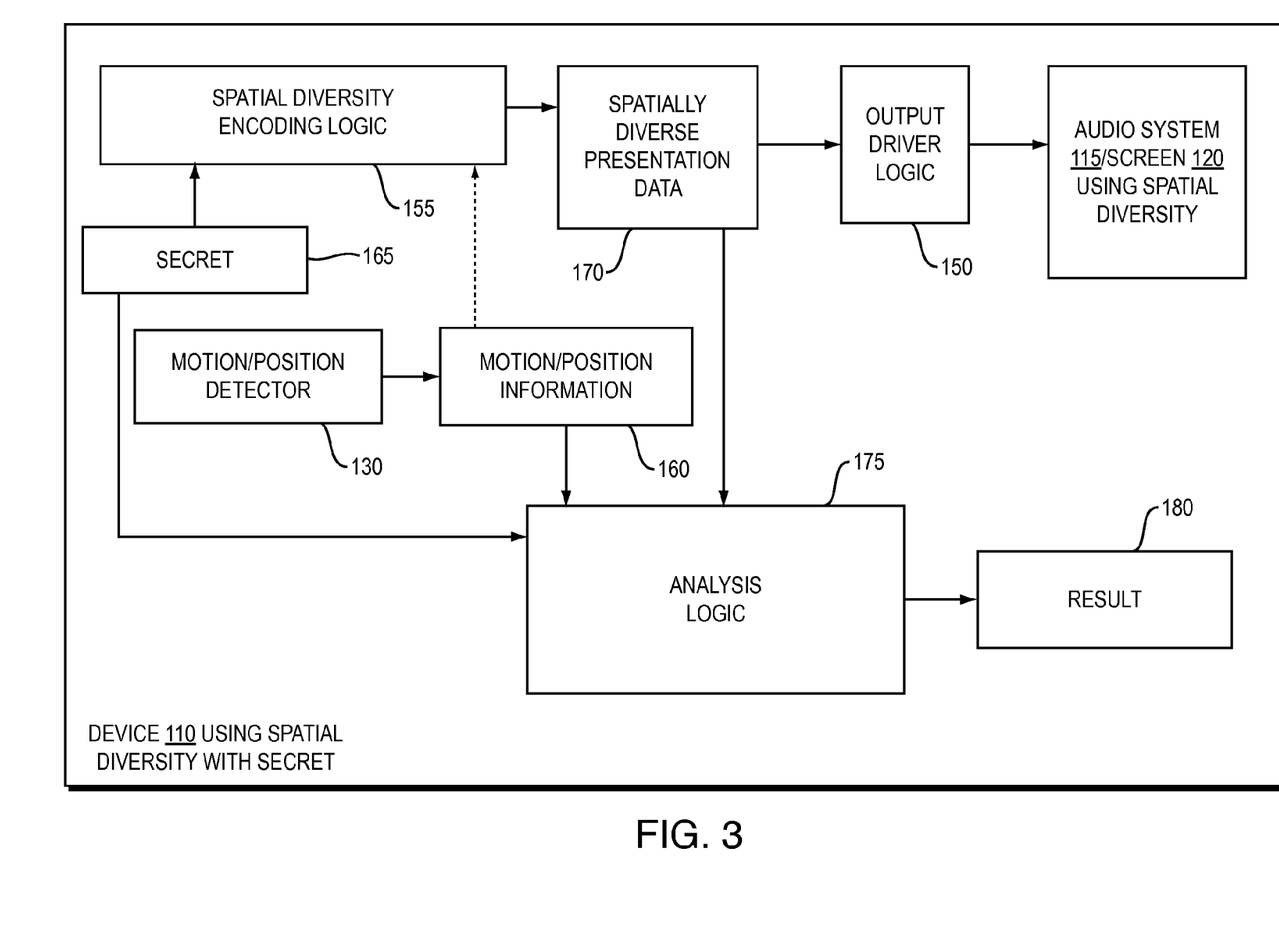
FIG. 3 is a block diagram of aspects of the example device of FIGS. 1-2.

Referring now also to FIG. 3, FIG. 3 illustrates further aspects of the example implementation, in which spatial diversity encoding logic 155 derives spatially diverse presentation data 170 from a secret 165, and output driver logic 150 uses data 170 to drive system 115 and/or screen 120. Detector 130 produces motion/position information 160. Analysis logic 175 derives a result 180 (e.g., an authentication result) from secret 165, data 170, and information 160. Information 160 may describe, for example, the current orientation of device 110 or plane 125 relative to the ground or to a plane that is at right angles to the direction of the force of gravity, and/or the current orientation or position of device 110 or plane 125 relative to a previous position or orientation of device 110 or plane 125, and/or a current acceleration or vector of motion of device 110.

In an example, screen 120 is used, the user starts out at viewing angle 0, secret 165 may be the text "dog", and logic 175 may require the user to signal that the user knows this secret 165. Logic 155 may derive data 170 that specifies an image of a cat as image I1, an image of a bird as image I2, and an image of a dog as image I3. Based on information 160 logic 175 may record a current orientation of plane 125 and then may determine whether plane 125 is rotated subsequently by angle A3 and stopped, in which case logic 175 determines that the user has rotated device 110 to the correct image, and result 180 indicates authentication success.

In a variation of the example, system 115 is used instead of screen 120, and logic 155 may derive data 170 that specifies a meowing sound as image I1, a chirping sound as image I2, and a barking sound as image I3. Based on information 160 logic 175 may record a current orientation of plane 125 and then may determine whether plane 125 is rotated subsequently by angle A3 and stopped, in which case logic 175 determines that the user has rotated device 110 to the correct image, and result 180 indicates authentication success.

In another variation of the example, secret 165 may be the text "dog, cat, bird", and based on information 160 logic 175 may determine whether plane 125 is rotated subsequently forward by angle A3 (for viewing I3), backward by angle A3-A1 (for viewing I1), and forward by angle A2-A1 (for viewing I2) and stopped, in which case logic 175 determines that the user has rotated device 110 to the correct images in the correct order, and result 180 indicates authentication success.

In other examples and/or implementations, secret 165 may include one or more images, sounds, words, PINs, and/or alphanumeric strings, logic 155 may take into account information 160 in producing data 170 (e.g., to take into account current orientation to avoid causing the user to make uncomfortable rotations), system 115 and screen 120 may be used together (e.g., to require use of both eyes and ears to authenticate), logic 175 may require a key press or other mechanism to indicate selection of an image, and/or logic 175 may require the user to rotate around more than one of axes 135, 145, 155 in a particular gesture or movement to authenticate.

A spatially diverse presentation may also be derived from or used with a challenge in a challenge-response protocol process. For example, device 110 may use the spatially diverse presentation to issue a challenge to the user in order to determine whether the user is authorized to perform an action in connection with device 110. The user then provides a response to device 110 by tilting and/or rotating device 110 as described above. If the response provided by the user matches the response expected by device 110, the user is allowed to perform the action.

In an example, the user may be given a challenge in the form of a small challenge number displayed within the user's "favorite" scene in the spatially diverse presentation. The response may then result from the user doing some basic arithmetic such as adding the challenge number to the user's "secret" number, and then inputting the sum via keypad or by tilting and/or rotating device 110 as described above.

Embodiments may implement the technique herein using code executed by a processor. For example, an embodiment may implement the techniques herein using code which is executed by a processor of the device on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method, comprising:
   presenting, by a device, a spatially diverse presentation comprising images at different viewing angles, wherein the images comprise an image based on a secret at a viewing angle;
   receiving a reaction of a user to the spatially diverse presentation, wherein the reaction comprises information relating to the movement of the device by the user between a starting position and a viewing position;
   performing an analysis of the reaction of the user to the spatially diverse presentation, wherein the analysis determines an angle between the starting position and the viewing position; and
   based on the analysis, helping to determine whether the user has knowledge of the secret.

2. The method of claim 1, wherein the analysis may be used to allow a user to prove knowledge of a secret password.

3. The method of claim 1, wherein the spatially diverse presentation is provided by a handheld electronic device.

4. The method of claim 1, wherein the spatially diverse presentation is provided by a small form factor 3-dimensional display.

5. The method of claim 1, wherein the spatially diverse presentation is used in a challenge-response protocol.

6. The method of claim 1, wherein the spatially diverse presentation comprises simultaneously presenting different images at different respective angles.

7. The method of claim 1, wherein the spatially diverse presentation is derived from a secret.

8. The method of claim 1, wherein the analysis is based on detection of a change in position of at least a portion of a device displaying the spatially diverse presentation.

9. A system, comprising:
   a processor and memory;
   the system configured to:
   present, by a device, a spatially diverse presentation comprising images at different viewing angles, wherein the images comprise an image based on a secret at a viewing angle;
   receive a reaction of a user to the spatially diverse presentation, wherein the reaction comprises information relating to the movement of the device by the user between a starting position and a viewing position;
   perform an analysis of the reaction of the user to the spatially diverse presentation, wherein the analysis determines an angle between the starting position and the viewing position; and
   based on the analysis, help to determine whether the user has knowledge of the secret.

10. The system of claim 9, wherein the analysis may be used to allow a user to prove knowledge of a secret password.

11. The system of claim 9, wherein the spatially diverse presentation is provided by a handheld electronic device.

12. The system of claim 9, wherein the spatially diverse presentation is provided by a small form factor 3-dimensional display.

13. The system of claim 9, wherein the spatially diverse presentation is used in a challenge-response protocol.

14. The system of claim 9, wherein the spatially diverse presentation comprises simultaneously presenting different images at different respective angles.

15. The system of claim 9, wherein the spatially diverse presentation is derived from a secret.

16. The system of claim 9, wherein the analysis is based on detection of a change in position of at least a portion of a device displaying the spatially diverse presentation.

* * * * *